(12) United States Patent
Budinski et al.

(10) Patent No.: US 7,771,858 B2
(45) Date of Patent: Aug. 10, 2010

(54) COATED STEEL BIPOLAR PLATES

(75) Inventors: Michael K. Budinski, Pittsford, NY (US); Gayatri Vyas, Rochester Hills, MI (US); Augusto O. Kunrath Neto, Golden, CO (US); John J. Moore, Evergreen, CO (US)

(73) Assignee: GM Global Technology Operations, Inc., Detroit, MI (US)

( * ) Notice: Subject to any disclaimer, the term of this patent is extended or adjusted under 35 U.S.C. 154(b) by 1114 days.

(21) Appl. No.: 11/180,835

(22) Filed: Jul. 12, 2005

(65) Prior Publication Data

US 2007/0015029 A1    Jan. 18, 2007

(51) Int. Cl.
    *H01M 2/00*    (2006.01)
(52) U.S. Cl. ....................................................... 429/34
(58) Field of Classification Search ........................ None
    See application file for complete search history.

(56) References Cited

U.S. PATENT DOCUMENTS

| | | | |
|---|---|---|---|
| 5,496,655 A * | 3/1996 | Lessing ........................ | 429/34 |
| 6,051,331 A | 4/2000 | Spear, Jr. et al. | |
| 6,379,476 B1 * | 4/2002 | Tarutani et al. ............. | 148/325 |
| 6,864,007 B1 * | 3/2005 | Iqbal et al. .................... | 429/34 |
| 2002/0122980 A1 | 9/2002 | Fleischer et al. | |
| 2004/0170881 A1 | 9/2004 | Nakata | |
| 2005/0008562 A1 | 1/2005 | Hyeon et al. | |
| 2005/0100774 A1 | 5/2005 | Abd Elhamid et al. | |

FOREIGN PATENT DOCUMENTS

| CN | 1505181 A | 6/2004 |
|---|---|---|
| JP | 2004185998 A | 7/2004 |

OTHER PUBLICATIONS

The definition of graphite (Hawley's Chemical Dictionary, 14th edition, 2002, John Wiley & Sons, Inc.).*
International Search Report dated Aug. 9, 2007 for Appln. No. PCT/US06/24951 filed Jun. 27, 2006 corresponding to this application.

* cited by examiner

*Primary Examiner*—Patrick Ryan
*Assistant Examiner*—Cynthia Lee
(74) *Attorney, Agent, or Firm*—Dinsmore & Shohl LLP

(57) ABSTRACT

In accordance with one embodiment of the present invention, an electrochemical conversion assembly comprises a plurality of electrochemical conversion cells and a plurality of electrically conductive bipolar plates. The electrochemical conversion cells are configured to communicate with first and second reactant supplies. Adjacent ones of the electrochemical conversion cells are separated by respective ones of the plurality of bipolar plates. The bipolar plates comprise an alloy comprising Fe and Cr. Respective surface portions of the bipolar plates are provided with electrically conductive, corrosion resistant layers that are placed in contact with portions of the electrochemical conversion cells. The corrosion resistant electrically conductive layers may comprise graphitic layers characterized predominantly by sp2 hybridized carbon-carbon bonding, molybdenum doped indium oxide layers, an electrically conductive Cr+N layer, or an electrically conductive $MoSi_2$ layer.

15 Claims, 4 Drawing Sheets

COATED STEEL BIPOLAR PLATES

BACKGROUND OF THE INVENTION

The present invention relates to electrochemical conversion cells, commonly referred to as fuel cells, which produce electrical energy by processing first and second reactants, e.g., through oxidation and reduction of hydrogen and oxygen. By way of illustration and not limitation, a typical cell comprises a polymer membrane (e.g., a proton exchange membrane) that is positioned between a pair of gas diffusion media layers and catalyst layers. A cathode plate and an anode plate are positioned at the outermost sides adjacent the gas diffusion media layers. All of theses components collectively form the cell unit.

The voltage provided by a single cell unit is typically too small for useful application. Accordingly, a plurality of cells are typically arranged and connected consecutively in a "stack" to increase the electrical output of the electrochemical conversion assembly or fuel cell. In this arrangement, two adjacent cell units can share a common polar plate, which serves as the anode and the cathode for the two adjacent cell units it connects in series. Such a plate is commonly referred to as a bipolar plate and typically includes a flow field defined therein to enhance-the delivery of reactants and coolant to the associated cells.

Bipolar plates for fuel cells are typically required to be electrochemically stable, electrically conductive, and inexpensive. Metallic bipolar plates are advantageous because they can be made very thin (e.g., <0.25 mm) and can be formed into a final shape by inexpensive metal forming techniques, such as stamping. However, metal plates are susceptible to corrosion. An active corrosion process in a fuel cell stack can increase the membrane resistance and the contact resistance of the bipolar plates, reducing the power density of the stack. Stainless steels have been considered for use in forming bipolar plates, due primarily to their inherent corrosion resistance and the relatively inexpensive material cost. Accordingly, the present inventors have recognized a need to provide for improved schemes for enabling the use of stainless steels in forming bipolar plates.

BRIEF SUMMARY OF THE INVENTION

According to the present invention, improved schemes for enabling the use of stainless steels in forming bipolar plates are provided. According to the present invention, an electrochemical conversion assembly is provided and comprises a plurality of electrochemical conversion cells and a plurality of electrically conductive bipolar plates. The electrochemical conversion cells are configured to communicate with first and second reactant supplies. Adjacent ones of the electrochemical conversion cells are separated by respective ones of the plurality of bipolar plates. The bipolar plates comprise an alloy comprising Fe and Cr. Respective surface portions of the bipolar plates are provided with electrically conductive, corrosion resistant layers that are placed in contact with portions of the electrochemical conversion cells. The corrosion resistant electrically conductive layers may comprise graphitic layers characterized predominantly by sp2 hybridized carbon-carbon bonding, molybdenum doped indium oxide layers, an electrically conductive Cr+N layer, or an electrically conductive $MoSi_2$ layer.

Accordingly, it is an object of the present invention to provide improved bipolar plates for use in an electrochemical conversion assembly. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals, where various components of the drawings are not necessarily illustrated to scale, and in which.

DETAILED DESCRIPTION

Figure 1:
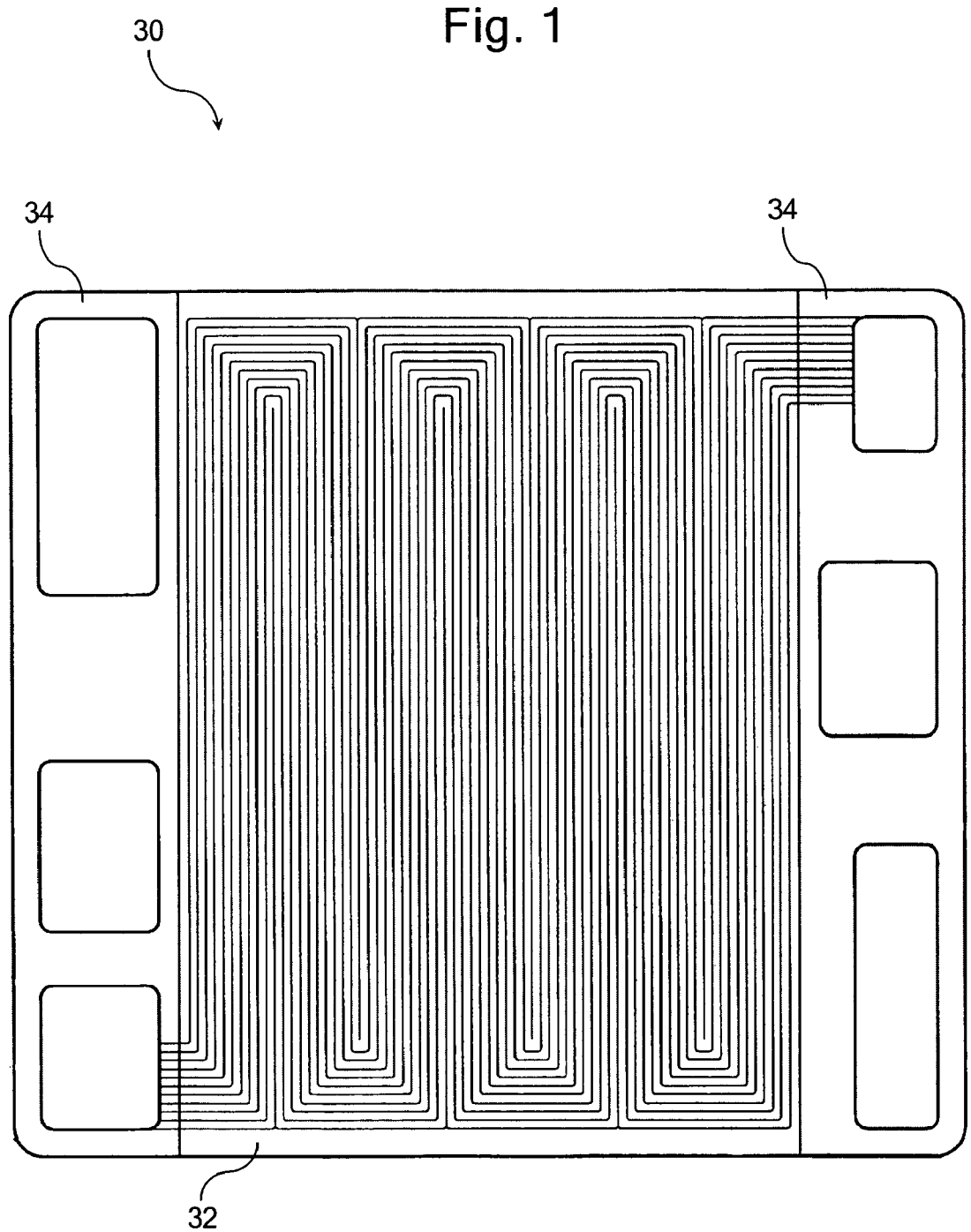
FIG. 1 is an illustration of a bipolar plate according to one embodiment of the present invention.
Figure 2:
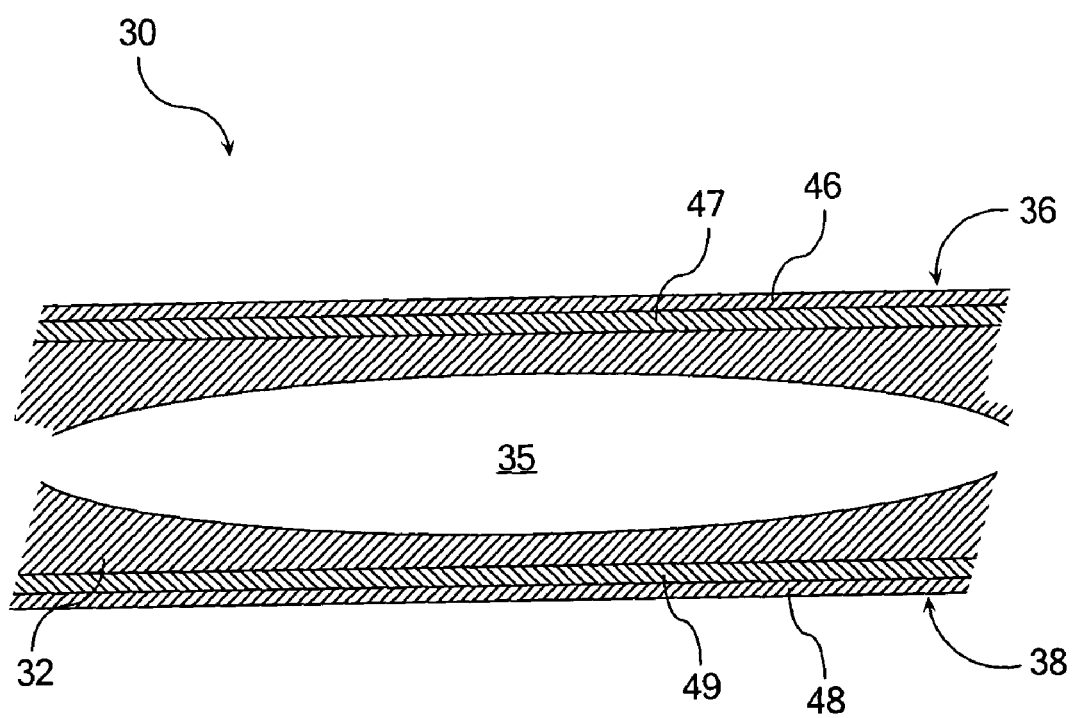
FIG. 2 is a cross-sectional illustration of a coated portion of a bipolar plate according to one embodiment of the present invention.
Figure 3:
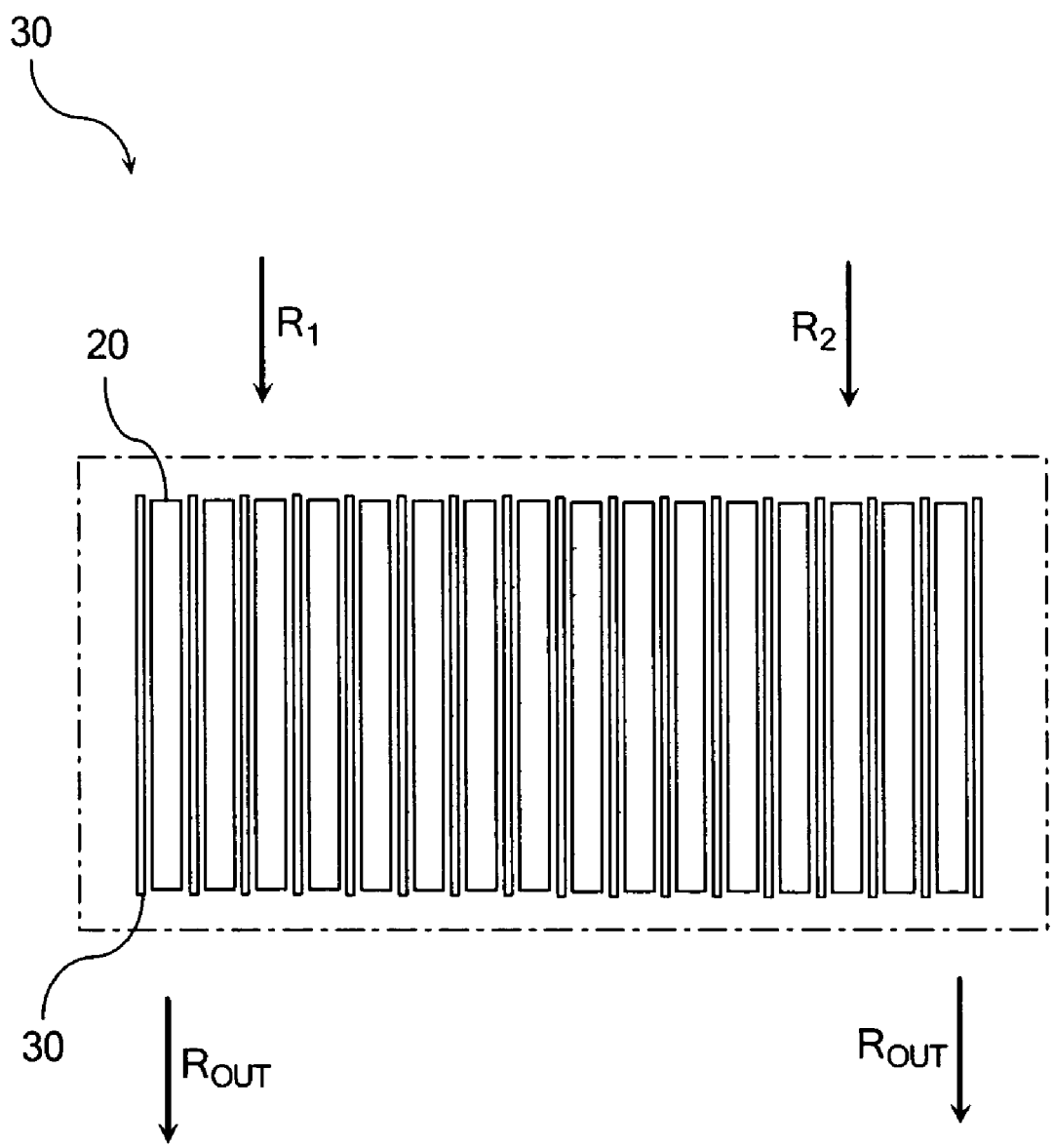
FIG. 3 is a schematic illustration of an electrochemical conversion assembly according to one embodiment of the present invention.

Referring to FIGS. 1-3, an electrochemical conversion assembly 10 according to the present invention is illustrated. Generally, the electrochemical conversion assembly 10 comprises a plurality of electrochemical conversion cells 20 and a plurality of electrically conductive bipolar plates 30. A variety of conversion assembly configurations are contemplated by the present invention, as long as the assembly utilizes one or more bipolar plates 30 between some or all of the respective electrochemical conversion cells 20. Indeed, the specific structure of the conversion assembly 10 and the individual conversion cells 20, is beyond the scope of the present invention and may be gleaned from any existing or yet to be developed teachings related to the design of an assembly that is capable of generating electricity from first and second chemical reactant supplies $R_1$, $R_2$ in communication with the electrochemical conversion cells 20. One or more reactant outlets $R_{OUT}$ are also typically provided.

Many aspects of the specific configuration of the bipolar plates 30 according to the present invention are also beyond the scope of the present invention. For example, referring specifically to FIG. 1, a bipolar plate 30 according to the present invention may comprise a flowfield portion 32 and fluid header portions 34 coupled to the flowfield portion 32. As is illustrated in FIG. 2, the flowfield portion 32 can include flowfield channels 35 defined between opposite, electrically conductive sides 36, 38 of the bipolar plate 30.

As is illustrated in FIG. 3, adjacent electrochemical conversion cells 20 are separated by respective ones of the plurality of bipolar plates 30. The bipolar plates 30 comprise an alloy of Fe and Cr and include a surface portion that comprises respective corrosion resistant electrically conductive layers 46, 48 along opposite sides 36, 38 of the bipolar plate 30. In this manner, the layers 46, 48 defined on opposite sides of a selected bipolar plate 30 can be placed in electrical contact with a corresponding electrochemical conversion cell 10 in the conversion assembly 10. Typically, the bipolar plates 30 will contact the gas diffusion media layers of the electrochemical conversion cell 10.

The corrosion resistant electrically conductive layers 46, 48 may comprise graphitic layers characterized predominantly by sp² hybridized carbon-carbon bonding, molybdenum doped indium oxide layers, an electrically conductive Cr+N layer, or an electrically conductive $MoSi_2$ layer. In the case of the graphitic layer, it is preferable that it be characterized substantially entirely by sp² hybridized carbon-carbon bonding. Graphitic layers according to the present invention are commonly characterized by an interfacial contact resistance less than about 10 mΩ-cm² under compression of at least about 100 psi (690 kPa) and can be produced by any suitable fabrication process. For example, and not by way of limitations, suitable fabrication processes are described in U.S. Pat. No. 6,726,993, "Carbon Coatings, Method and Apparatus for Applying them, and Articles Bearing Such Coatings," the disclosure of which is incorporated herein by reference.

Indium oxide layers according to the present invention may be doped with any suitable amount of molybdenum, depending on the particular demands at issue. For example, the indium oxide layer can be doped with less than about 4 wt. % molybdenum or, more preferably, about 2 wt. % molybdenum. Doped indium oxide layers according to the present invention are often characterized by an interfacial contact resistance less than about 15 mΩ-cm² under compression of at least about 100 psi (690 kPa). As is noted above, the layers 46, 48 according to the present invention can be produced by any suitable fabrication process, e.g., sputter deposition, thermal reactive evaporation, pulsed laser deposition, etc.

Where the corrosion resistant electrically conductive layers 46, 48 comprise Cr+N, suitable candidates include, but are not limted to, a layer of CrN, $Cr_2N$, or a layer of Cr and N in solid solution. Cr+N layers according to the present invention commonly exhibit an interfacial contact resistance less than about 45 mΩ-cm² under compression of at least about 100 psi (690 kPa). The Cr+N layers 46, 48 may comprise material deposited on the bipolar plates 30 through magnetron sputtering, or any other suitable fabrication scheme.

Corrosion resistant electrically conductive layers 46, 48 formed from $MoSi_2$ are typically characterized by an interfacial contact resistance less than about 40 mΩ-cm² under compression of at least about 100 psi (690 kPa). The $MoSi_2$ layers may be formed through sputter deposition, preferably with the bipolar plate substrate biased at about negative 50V.

It is contemplated that the bipolar plate 10 may be subject to a variety of types of pre-treatment processes prior to deposition of the corrosion resistant electrically conductive layers 46, 48. For example, where the layers 46, 48 comprise Cr+N or $MoSi_2$ layers formed through sputter deposition, the surface of the bipolar plate 30 may fist be subject to sputter etching in an Ar atmoshphere.

The subject matter of FIG. 2 is not necessarily illustrated to scale and it is contemplated that respective layers 46, 48 may actually comprise a plurality of component layers that collectively define the thickness of each layer 46, 48. Further, the layers 46, 48 may be formed over a suitable underlayer 47, 49 formed on the bi-polar plate 30. The specific composition of the underlayer 47, 49 is beyond the scope of the present invention and may be gleaned from specific teachings focusing on the use of metallic and non-metallic underlayers to improve, the adhesion, durability and perfomance of specific types of coatings. For example, in the context of a graphitic layer according to the present invention, the underlayer may comprise a metal-containing underlayer deposited to a thickness of between 50 and 200 nm. The underlayer can comprise an initial stratum of metal followed by a second stratum consisting of the metal and carbon produced by co-deposition from metal and carbon targets. This stratum may be harder than the metal stratum and can improve the tribological behaviour of the subsequent carbon coating.

Bipolar plates according to the present invention typically define a thickness of well below 500 μm while the corrosion resistant electrically conductive layers 46, 48 define thicknesses of between about 0.5 μm and about 10 μm in the case of graphitic carbon, between about 1.0 μm and about 3 μm in the case of molybdenum doped indium oxide, between about 1.0 μm and about 2.5 μm in the case of Cr+N, and between about 1.0 μm and about 2.0 μm in the case of $MoSi_2$. Of course other suitable thicknesses are contemplated. Suitable bipolar plate alloys may be selected from a variety of materials including, but not limited to, alloys comprising Ni, Mo, Mn, Si, C, or N, in combination with Fe and Cr, stainless steels, austenitic stainless steels, etc.

As is noted above, the specific structure of the conversion assembly 10 and the individual conversion cells 20, is beyond the scope of the present invention. However, it is noted that typical conversion assemblies comprise respective membrane electrode assemblies that are configured to operate with hydrogenous gas and air as the respective reactant supplies. Again by way of illustration and not limitation, the electrochemical conversion cells 20 may comprise respective electrolytic membranes, gaseous diffusion layers, catalytic components, carbonaceous components, electrically conductive components, and combinations thereof. Finally, although the bipolar plates 30 illustrated in FIGS. 1 and 2 comprise a flowfield defined between the opposite, electrically conductive sides of the bipolar plate 30, it is contemplated that suitable bipolar plate configurations need not include a flowfield.

Figure 4:
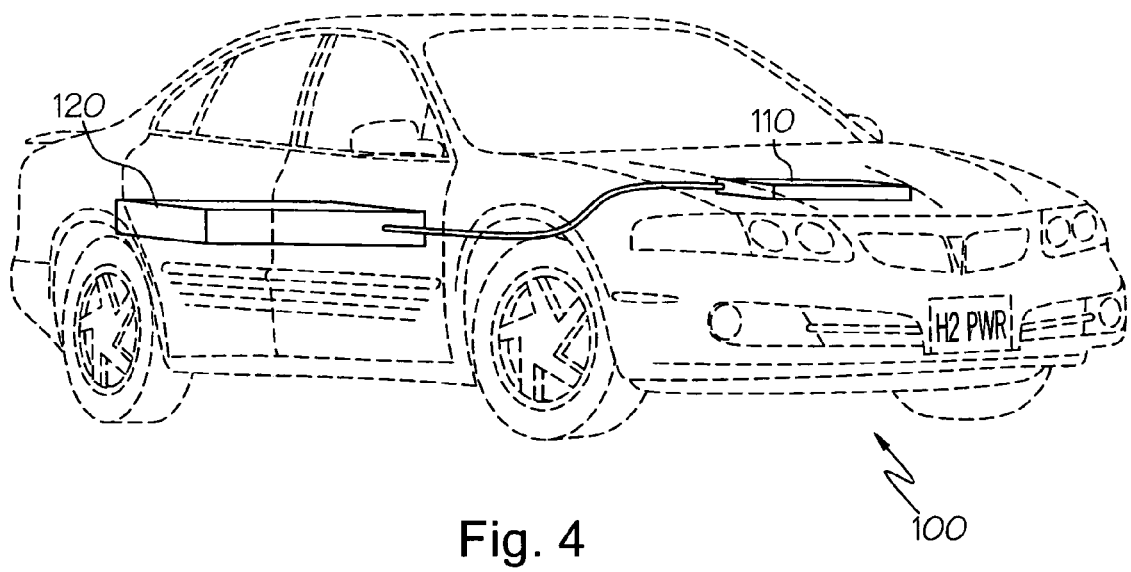
FIG. 4 is a schematic illustration of a vehicle having a fuel processing system and an electrochemical conversion assembly according to one embodiment of the present invention.

Referring to FIG. 4, a device according to the present invention may comprise a vehicle 100 and an electrochemical conversion assembly 110 according to the present invention. The electrochemical conversion assembly 110 can be configured to at least partially provide the vehicle 100 with motive power. The vehicle 100 may also have a fuel processing system or fuel source 120 configured to supply the electrochemical conversion assembly 110 with fuel.

Although the present invention is not limited to any specific reactant compositions, it will be appreciated by those practicing the present invention and generally familiar with fuel cell technology that the first reactant supply $R_1$ typically comprises oxygen and nitrogen while the second reactant supply $R_2$ comprises hydrogen.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A device comprising an electrochemical conversion assembly, said electrochemical conversion assembly comprising a plurality of electrochemical conversion cells and a plurality of electrically conductive bipolar plates, wherein:

said electrochemical conversion cells are configured to communicate with first and second reactant supplies;

adjacent ones of said electrochemical conversion cells are separated by respective ones of said plurality of bipolar plates;

said bipolar plates comprise an alloy comprising Fe and Cr;

respective surface portions of said bipolar plates comprise graphitic layers characterized predominantly by $sp^2$ hybridized carbon-carbon bonding, wherein a thickness of said graphitic layers is less than about 10 μm;

an underlayer formed on said bi-polar plate alloy between said bi-polar plate alloy and said graphitic layers, said underlayer comprising a metal and carbon, wherein a thickness of said underlayer is between 50 and 200 nm; and respective graphite layers of said bipolar plates are in contact with portions of said electrochemical conversion cells.

2. A device as claimed in claim 1 wherein said graphitic layers are characterized substantially entirely by $sp^2$ hybridized carbon-carbon bonding.

3. A device as claimed in claim 1 wherein said graphitic layers are characterized by an interfacial contact resistance less than about 10 mΩ-cm$^2$ under compression of at least about 100 psi (690 kPa).

4. A device as claimed in claim 1 wherein said graphitic layers are defined on opposite sides of a selected bipolar plate so as to contact one of a pair of electrochemical conversion cells separated by said selected bipolar plate.

5. A device as claimed in claim 1 wherein respective ones of said graphitic layers define a plurality of component graphitic layers collectively defining a single graphitic layer.

6. A device as claimed in claim 1 wherein said graphitic layers define between about 0.1% and about 10.0% of a thickness of respective ones of said bipolar plates.

7. A device as claimed in claim 1 wherein said alloy further comprises Ni, Mo, Mn, Si, C, N and combinations thereof.

8. A device as claimed in claim 1 wherein said alloy comprises Fe, Cr, Ni, Mn, Si, and C.

9. A device as claimed in claim 1 wherein said alloy comprises an austenitic stainless steel.

10. A device as claimed in claim 1 wherein said first reactant supply comprises a source of hydrogenous gas and said second reactant supply comprises a source of air.

11. A device as claimed in claim 1 wherein said bipolar plates comprise a flowfield defined between opposite, electrically conductive sides of said bipolar plate.

12. A device as claimed in claim 1 wherein said electrochemical conversion cells comprise respective membrane electrode assemblies.

13. A device as claimed in claim 1 wherein said electrochemical conversion cells comprise respective electrolytic membranes, gaseous diffusion layers, catalytic components, carbonaceous components, electrically conductive components, and combinations thereof.

14. A device as claimed in claim 1 wherein said device further comprises a fuel processing system or fuel source for providing a hydrogenous gas to said electrochemical conversion assembly.

15. A device as claimed in claim 1 wherein:

said device further comprises a vehicle; and said electrochemical conversion assembly is configured to at least partially provide said vehicle with motive power.

* * * * *